United States Patent
Thomas et al.

(10) Patent No.: US 6,529,992 B1
(45) Date of Patent: Mar. 4, 2003

(54) SELF-CONTAINED APPLICATION DISK FOR AUTOMATICALLY LAUNCHING APPLICATION SOFTWARE OR STARTING DEVICES AND PERIPHERALS

(75) Inventors: Trent M. Thomas, Ogden, UT (US); Christopher R. Low, Farmington, UT (US); Stephen Larry McBride, North Ogden, UT (US); Troy Taylor Davidson, Clinton, UT (US)

(73) Assignee: Iomega Corporation, Roy, UT (US)

( * ) Notice: Subject to any disclaimer, the term of this patent is extended or adjusted under 35 U.S.C. 154(b) by 0 days.

(21) Appl. No.: 09/360,337

(22) Filed: Jul. 26, 1999

(51) Int. Cl.$^7$ .............................................. G06F 12/00
(52) U.S. Cl. ............................ 711/1; 711/166; 711/170
(58) Field of Search ............................... 707/1, 7, 204; 703/21; 711/1, 166, 170; 713/2, 202; 714/15; 360/98.04, 99.06, 96.5; 369/34; 710/19

(56) References Cited

U.S. PATENT DOCUMENTS

| | | | | |
|---|---|---|---|---|
| 4,833,554 A | * | 5/1989 | Dalziel et al. ............ 360/98.04 |
| 5,488,522 A | * | 1/1996 | Peace et al. ............. 360/99.06 |
| 5,493,461 A | * | 2/1996 | Peace ........................ 360/96.5 |
| 5,711,672 A | * | 1/1998 | Redford et al. ............. 434/307 |
| 5,732,266 A | | 3/1998 | Moore et al. ................ 395/651 |
| 5,764,972 A | * | 6/1998 | Crouse et al. .................. 707/1 |
| 5,819,082 A | * | 10/1998 | Marion .......................... 707/7 |
| 5,832,213 A | * | 11/1998 | Duncan ...................... 713/202 |
| 5,832,523 A | * | 11/1998 | Kanai et al. ................. 707/204 |
| 5,835,759 A | | 11/1998 | Moore et al. ................ 395/651 |
| 5,999,722 A | * | 12/1999 | Ketterer et al. ................ 703/21 |
| 6,006,034 A | | 12/1999 | Heath et al. ................. 395/712 |
| 6,170,055 B1 | * | 1/2001 | Meyer et al. ................... 713/2 |
| 6,205,558 B1 | * | 3/2001 | Sobel ........................... 714/15 |
| 6,208,044 B1 | * | 3/2001 | Viswanadham et al. ....... 310/12 |
| 6,222,799 B1 | * | 4/2001 | Lee .............................. 369/34 |
| 6,249,806 B1 | * | 6/2001 | Parry et al. ................... 710/19 |

* cited by examiner

Primary Examiner—David Hudspeth
Assistant Examiner—Fred F. Tzeng
(74) Attorney, Agent, or Firm—Parsons Behle & Latimer (57) ABSTRACT

A system and method for automatically executing a participating application upon insertion of a removable media into a computing device. When the computing device detects that the removable media containing has been inserted, a task disk control file is read from the removable media. The task disk control file contains all of the configuration information necessary to run the participating application from the removable media. The participating application is then launched for use by a user. After the user is finished using the participating application, the removable disk is automatically ejected. In addition to monitoring for insertion of the removable media, events such as a completion of the self-contained application and a request to eject the media are monitored. When a completion event is encountered, all data files are saved, temporary files deleted and configuration information removed prior to the removable disk ejection. When an ejection event is encountered, the computing device is instructed to wait until the completion events are executed prior to actual ejection of the removable media.

26 Claims, 4 Drawing Sheets

```
###############################################################

#       Task disk control file example

###############################################################

###############################################################
# symbols
#          [ ] - indicates a registry Key
#           +  - add or modify a registry value
#           -  - remove registry Item
#          { } - section header
###############################################################

#--------------- Pre-run section -----------------
{ PRE-RUN }
       +[HKLM\Software\Iomega\APP\]
              +RunPath="$:\app1\app1.exe"
       +[HKCR\.myapp]
              +Default="MYAPPICON"
       +[HKCR\MYAPPICON\shell\command\Open]
              +Default="$:\app1\app1.exe %1"

# if we need to pre-load an application:
       load=$:\preloadapp.exe

#--------------- Application run section -----------------
{ RUN }
       load=$:\app1\app1.exe

#-------------- clean-up section ---------------
{ POST-RUN }
       -[HKLM\Software\Iomega\APP\]
       -[HKCR\.myapp]
       -[HKCR\MYAPPICON\shell\command\Open]

# if we need to post-load an application:
       load=$:\prostloadapp.exe
```

220

SELF-CONTAINED APPLICATION DISK FOR AUTOMATICALLY LAUNCHING APPLICATION SOFTWARE OR STARTING DEVICES AND PERIPHERALS

FIELD OF THE INVENTION

The present invention relates to application software contained on removable storage media. In particular, the present invention relates to a system wherein instructions to configure operating system environmental variables and to load predetermined application software are stored on removable media such that the application and its associated data files are automatically launched for use upon insertion of the removable disk into a removable media drive.

BACKGROUND OF THE INVENTION

In the beginning of the personal computing era, software applications were simple and small mainly because of limitations in storage and computing power. For example, one of the first widely used software applications, VisiCalc, was only 25 kB in size and was typically run from a floppy disk. Because of these limitations, data files created by VisiCalc were often stored on the same floppy disk as the program file. However, as processing power and capabilities of personal computers increased, additional features were added to software applications to take advantage the increased processing power. These features have lead to a tremendous increase in the size of software applications. For example, Microsoft® Excel97 now has an executable file that is approximately 5.4 MB, which is an increase of 21,600% over the early VisiCalc spreadsheet software. In addition, this figure fails to account for the shared files that Microsoft® Excel97 requires for proper execution. Because of the increase in size and complexity of modem software, applications are no longer developed to be executed from a single piece of removable media, and at a minimum, must be partially installed to the computer's hard disk drive for use.

While modem software applications have greater functionality and are easier to use than their early counterparts, they have created usability problems for end users. A first problem is that managing data files has become increasingly difficult. With personal computer hard drives exceeding 20 GB in storage capacity, users can store almost everything they generate and download. Naming, organizing and differentiating between data files is extremely difficult, particularly in view of the common practice of users to name and save files using cryptic or uninformative names (e.g., today.doc, temp.xls, or junk.txt).

Another problem has been created by the shear number of personal computers an peripherals devices. A typical user may have a computer at home, a computer at work, and a portable computer (e.g., notebook) that he or she uses every day. Thus, if a user wants to use a particular data file(s) on more than one computer, the user must manually copy the data file(s) to a removable disk and either access the data file(s) from the removable disk or copy them to the other computer. In addition, each computer that the user wants to use must have the particular piece of software that generated the data file(s) installed thereon in order to properly access the data. Inevitably, as users move data from one computer to another, data is lost as newer files are overwritten by older versions. Further complicating file management tasks is when the user creates several pieces of removable media containing several versions of the data files and then must figure out which version is the correct version by looking at the time stamps or inspecting the contents of each of the data files. Peripheral devices and their associated software have become numerous and are in many cases difficult to use. In addition, many peripheral devices create data files that must be saved for use by other application software.

There have been some advances in file management. These include file managers and applications that synchronize files between computers to reduce the effort necessary to maintain current versions of data files on multiple computers. However, these programs are severely limited because they typically cannot synchronize files between more than two computers. In addition, the files to be synchronized are often manually selected by the users. Thus, if a particular piece of software creates and access multiple data files, the user must manually select all of the data files for synchronization between two computers, otherwise errors may occur. Often users forget to select a particular data file for synchronization and later find that they are unable to utilize any of the data on another computer. This problem not only affects synchronization programs, but also occurs when users manually copy data files to removable media, in the scenario noted above.

There have been other advances in making computers easier use, such as graphical user interfaces and applications that automatically launch programs contained on removable media. An example of an application that automatically launches another application upon insertion of the removable media into a computer and include the Windows® "Autorun" feature which automatically runs an application contained on, e.g., a CD-ROM. When the CD-ROM is inserted into the drive, the operating system checks for a file named "autorun.inf" in the root directory of the CD. Within the autorun.inf file is a pointer to an executable file named "autorun.exe" which launches the software on the CD. Typically, the Autorun feature is used to launch software setup/install routines to install software contained on the CD to the hard drive. However, the Autorun feature is limited in that it does not configure a computer to run application software based on instructions contained on the removable media, nor does the Autorun feature have the ability to manage events such as ejection of the removable media, closing of the application running from the removable media, and storage of data files to the removable media.

However even with the above advancements, computers remain difficult for many people to use. For example, when a user turns on the computer, he or she is most often presented with the graphical user interface. At this point, it is up to the user to navigate to and launch the application software that he or she desires to use. Although this task seems relatively easy, it is not for many users as there is no standardization on where a particular application software is located on the computer. Clearly, the personal computer has failed to achieve the simplicity of other home appliances, which has prevented large numbers of people from accepting and using computers.

In view of the above, there is a need for a method and apparatus for facilitating the maintenance and use of a user's data, application software and computer devices. Further, there is a need for a method and apparatus that performs these functions automatically with little or no input from the user in order to prevent accidental loss of data and to provide ease of application use. Such a need would be solved by an self-contained application stored on removable media that is adapted to automatically start devices or launch application software from the removable media or the computer's hard drive upon insertion into the computer, while also saving the data files to the removable media or other predetermined location. The present invention provides such a solution.

SUMMARY OF THE INVENTION

In view of the above, the present invention, through one or more of its various aspects and/or embodiments is thus presented to accomplish many advantages, such as those noted below.

In accordance with the present invention, there is provided an application or service that resides on a computer that automatically, and without requiring any user intervention, recognizes the insertion of a piece of removable media. The removable media contains a task disk control file that contains all of the configuration information necessary to run participating applications from the removable media. In particular, the task disk control file contains three sections of configuration information as follows: pre-run, application run, and clean-up. The pre-run section configures registry information such that the operating system is aware of the path, environmental variables and command line to launch the participating application. Optionally, the pre-run section may specify files (e.g., executable files, DLLs, device drivers, etc.) that are to be copied to the hard drive to properly execute the participating application. The application run section instructs the operating system to load the participating application, which launches the participating application for use by a user. The clean-up section removes all registry information added by the pre-run section. Optionally, the clean-up section may remove from the hard drive the files copied thereto to execute the participating application.

After reading the task disk control file and configuring the computing device, the participating application is then launched for use by a user. Once the user is finished using the participating application, the removable disk is automatically ejected. In addition to monitoring for insertion of the removable media, events such as a completion of the self-contained application and a request to eject the media are monitored. When a completion event is encountered, all data files are saved, temporary files are deleted and configuration information is removed prior to the removable disk ejection. When an ejection event is encountered, the computing device is instructed to wait until the completion events are executed prior to actual ejection of the removable media.

The system of the present invention serves to greatly simplify the use and operation of computer application software, devices and peripherals because users are not required to have any knowledge of how to launch the application or start the devices and peripherals they wish to use other than such applications, devices and peripherals will be launched/started automatically upon insertion of the removable media. Other features of the invention are described below.

BRIEF DESCRIPTION OF THE DRAWINGS

The foregoing summary, as well as the following detailed description of the preferred embodiments, is better understood when read in conjunction with the appended drawings. For the purpose of illustrating the invention, there is shown in the drawings an embodiment that is presently preferred, in which like reference numerals represent similar parts throughout the several views of the drawings, it being understood, however, that the invention is not limited to the specific methods and instrumentalities disclosed. In the drawings.

DETAILED DESCRIPTION OF THE PREFERRED EMBODIMENTS

The present invention provides a novel application on a removable disk used within a computing environment to maintain application software, data and devices. In accordance with the present invention, a user inserts the removable disk containing the application software to be executed into the personal computer, and the software application or device is automatically launched/started and readied for use. The present invention advantageously allows a user to maintain everything he or she needs using a removable disk.

Figure 1:
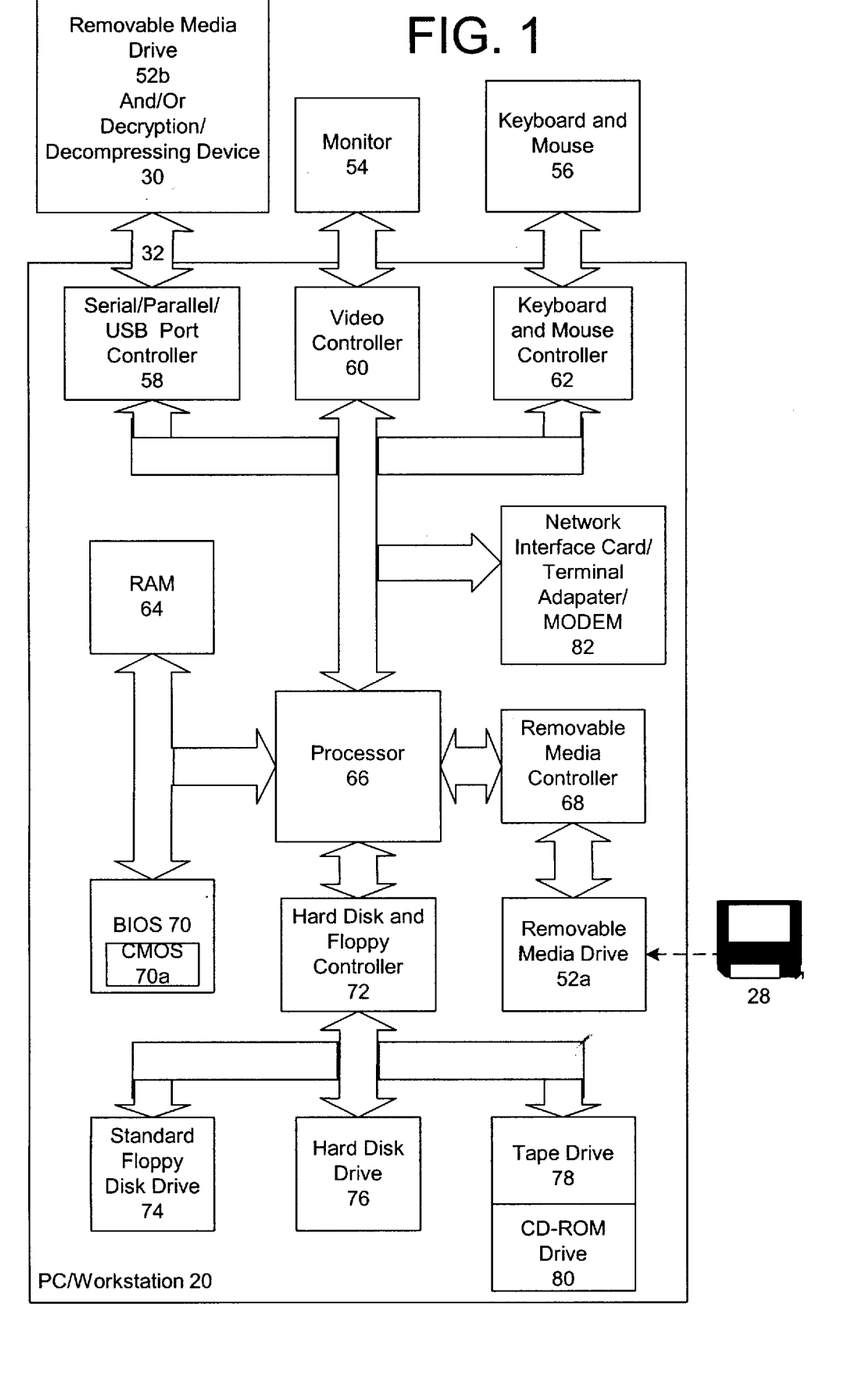
FIG. 1 is a block diagram of the components of a personal computer in which the present invention is embodied.
Figure 2:
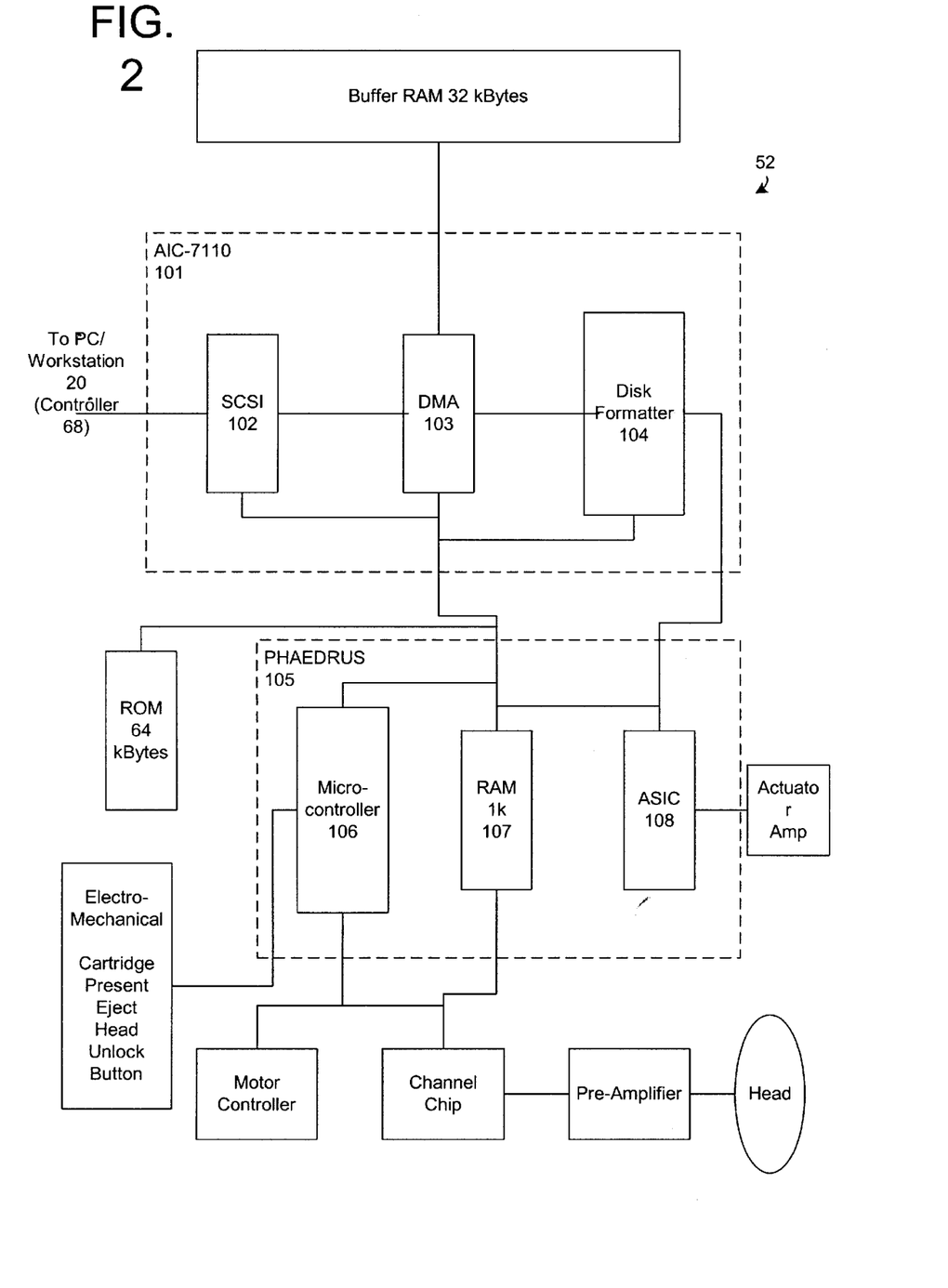
FIG. 2 is a block diagram of the components of a preferred removable media drive shown in FIG. 1.

Referring now to FIGS. 1–2, exemplary hardware in which the present invention may be embodied will be described. As illustrated, the preferred platform is a personal computer (PC) 20, which may comprise Windows® 95/98 or Windows NT® Workstation-based personal computer having, e.g., an Intel Pentium( processor or higher, a long-term non-removable storage device (e.g., a IDE or SCSI hard disk), a removable media drive (e.g., CD-R, CD-RW, DVD, or other removable floppy or hard disk drive), random access memory (RAM), communication peripherals (e.g., network interface card, modem, and/or terminal adapter), and suitable application programs (e.g., Dial-up networking software and a Web Browser).

As shown, the PC 20 may be divided between internal and external components. The internal components include a Basic Input/Output System (BIOS) 70 and a processor (CPU) 66 that control the overall functioning of the PC 20. Memory 64, a hard disk drive 76, a floppy disk drive 74, a tape drive 78, a CD-ROM drive 80, a MODEM/Terminal Adaptor/Network Interface Card 82, and a removable media drive 52a are also connected to the CPU 66. The removable media drive 52a or 52b operates to read and/or write to a storage media contained within a removable storage cartridge 28. The exemplary PC 20 of FIG. 1 is configured with two removable media drives 52a and 52b to emphasize that a removable media drive can be implemented in either internal or external form.

By way of a non-limiting example, the removable media 28 may comprise a ZIP® disk manufactured by Iomega Corporation, Roy, Utah. Each Iomega ZIP® disk contains a unique serial number that is written to a predetermined track during the formatting process which may be used as the unique identifier. The serial number is preferably created by but not limited to a pseudo random number generator. Further, while the media 28 has been described in terms of a ZIP® disk, it is not limited to the ZIP® disk, as the use of other removable media types having a unique serial number is within the scope and spirit of the present invention such as CD-R, DVD-RAM, and other removable floppy and hard disks.

The MODEM/Terminal Adaptor/Network Interface Card 82 may comprise individual cards performing communications-related functions, as known in the art. The MODEM/Terminal Adaptor/Network Interface Cards 82 are included within PC 20 to provide communications to external networks to which the PC 20 is connected. In particular, the MODEM/Terminal Adaptor/Network Interface Card 82 may be used to access LAN 14, ISP 18 and network infrastructure 12.

Communications between internal and external devices may be accomplished via controllers provided within the PC 20. A serial/parallel/USB port controller (which may comprise separate controllers) 58, a monitor controller (video card) 60, and a keyboard and mouse controller 62 each provide an interface between the CPU 66 and an external removable media drive 52b (or printer), monitor 54, and keyboard and mouse device 56, respectively. A hard disk and floppy disk controller 72 serves as an interface between the CPU 66 and the hard disk 76 and the CD-ROM drive 80, and the floppy disk 74 and tape drive 78, respectively. It will be appreciated by those skilled in the art that the disk controller 72 may comprise separate floppy and hard disk controllers (e.g., IDE or SCSI controller).

A removable media controller 68 serves as an interface between the removable media drive 52a and the CPU 66. For example, the removable disk controller 68 may comprise a Small Computer System Interface (SCSI) or Integrated Drive Electronics (IDE) interface controller. A hard disk and floppy disk controller 72 serves as an interface between the CPU 66 and the hard disk 76 and the CD-ROM drive 80, and the floppy disk 74 and tape drive 78, respectively. Alternatively, the removable media drive 52a may utilize the disk controller 72 as an interface to the CPU 66.

Referring now to FIG. 2, there is illustrated a block diagram of an exemplary media drive 52 having a SCSI interface to the PC 20 (via controller 68). The media drive 52 preferably comprises, a ZIP® drive, manufactured by Iomega Corporation, Roy, Utah; however, the present invention is not limited to such removable media drives and other media drives may be used as media drive 52. The media drive 52 includes components that provide for communication between the read/write channel for the media (lower right side of diagram) and the PC 20 (upper left side of diagram). The media drive 52 includes an AIC chip 101 which performs the SCSI 102, the direct memory access (DMA) 103, and disk formatter 104 functions. The interface also includes a PHAEDRUS 105 which includes an 8032 microcontroller 106, a 1 kByte RAM 107 and an application specific integrated circuit (ASIC) 108. The ASIC 108 may perform various functions, such as servo sequencing, data splitting, EOC, ENDEC, A-to-D, and D-to-A conversion. The communication between the media drive 52 and the PC 20 is accomplished through transfers of data between the input/output channel of the media drive 52 and the media controller 68 (e.g., SCSI controller) of the PC 20.

Figure 3:
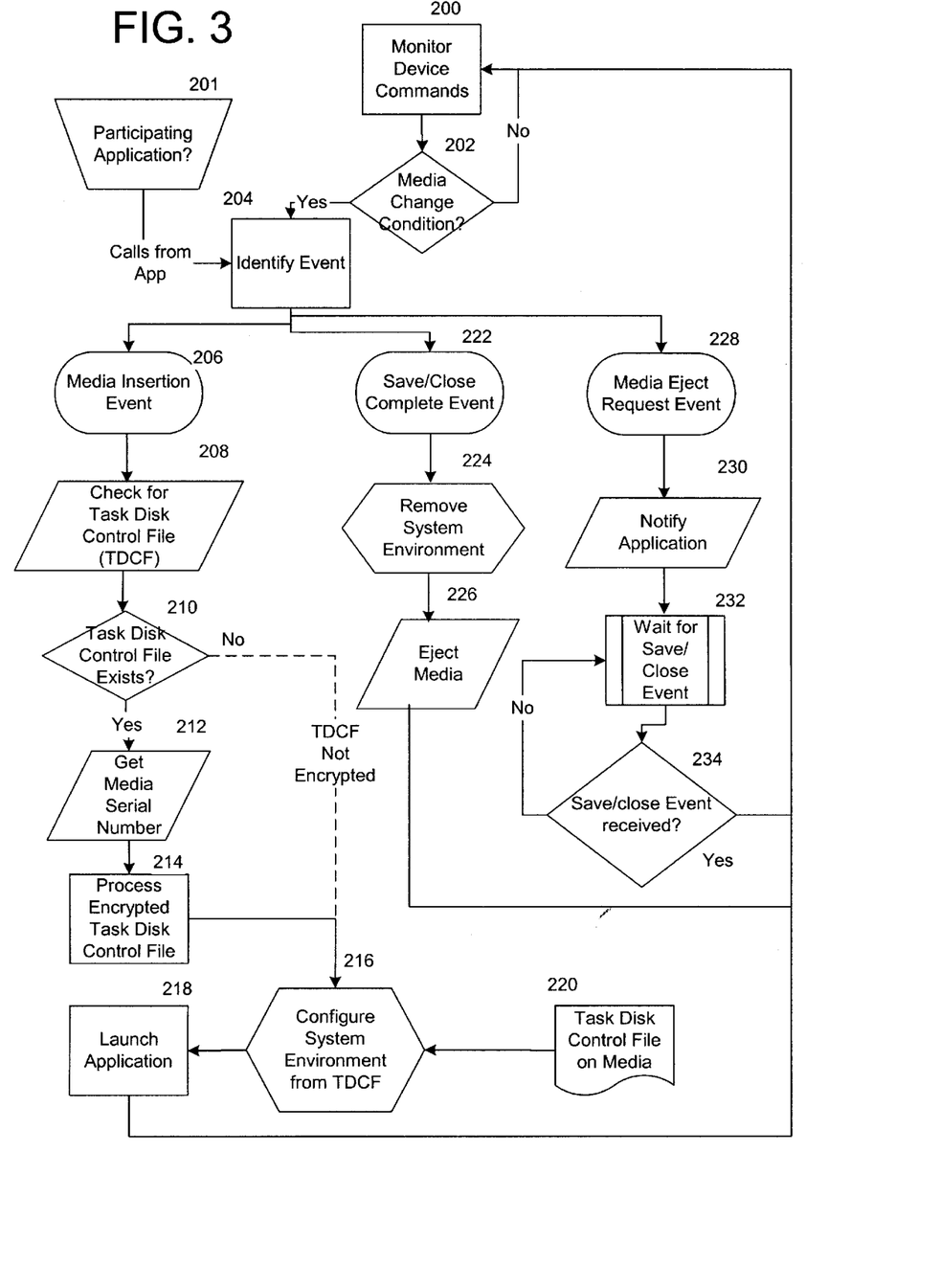
FIG. 3 is a flow chart illustrating an overview of the processes performed by the present invention.

Referring now to FIG. 3, there is a flow chart illustrating the processes performed by the present invention. As will become evident to those of ordinary skill in the art, the features and aspects of the present invention discussed below may be implemented by any suitable combination of hardware, software and/or firmware. Preferably, the present invention runs as a background task or service that recognizes and reads a task disk control file stored on the removable media upon detection of insertion of the removable media into the computer. The task disk control file includes instructions to configure the computer operating environment and launch application software resident on the removable media or the computer's hard disk (or on both). Also, the task disk control file may be used to start application software that controls computer devices and/or the devices themselves. Upon closing the predetermined application software or device, data files are saved in accordance with instructions in the control file, the computer's environment is cleaned-up and the removable media is ejected. As will be described below, the system of the present invention serves to greatly simplify the use and operation of computer application software, devices and peripherals because users are not required to have any knowledge of how to launch the application or start the device or peripheral they wish to use. In other words, all the user needs to know is that the application, device or peripheral he or she wants to use will be automatically launched/started upon insertion of the removable media.

The details of the present invention will now be described with reference to FIG. 3. An application or system service running on the PC 20 monitors device commands to and from the removable media drive 52 (step 200). It is preferable that this be a background application or service that is loaded when the computer is booted-up. An example of such an application to monitor device commands to the removable media drive 52 is IOwatch, available from Iomega Corporation, Roy, UT. The application or service resides on the computer 20 and automatically, and without requiring any user intervention, recognizes the insertion of a piece of removable media.

At step 202 it is determined if a monitored device command is "a media change condition." Media change conditions indicate that removable media 28 has been inserted in to the removable media drive 52 or that some action has occurred with regard to the removable media 28 currently in the drive 52. If no media change condition is present at step 202, then processing returns to step 200 to monitor for subsequent device commands.

If a media change condition is present at step 202, then the present invention begins its processing by identifying an event type associated withe the media change condition. Events that may be identified and routed at step 204 include, but are not limited to: device events and events resulting from calls from a "participating application" 201. A "participating application" 201 is defined herein as a software application that has knowledge of, and cooperates with, the present invention by making and accepting event calls to and from the present invention. The participating application may be located on, e.g., the hard disk 76, the removable media 28, a CD-ROM, or network location. In addition, participating applications may control peripherals and devices attached to or within the computer (e.g., tape drives, scanners, etc.). Media change conditions are provide to the present invention by known mechanisms such as inter-application messages, program calls, and event notifications.

A first identified event may be a media insertion event (step 206), which is a condition that exists when the removable media 28 is inserted into the removable media drive 52. The media may be detected as inserted by the drive in accordance with the method of U.S. Pat. No. 5,854,719, to Ginosar et al., which is incorporated herein by reference in its entirety. At step 208, the system then checks for the presence of a task disk control file (TDCF) 220 on the media 28.

Figure 4:
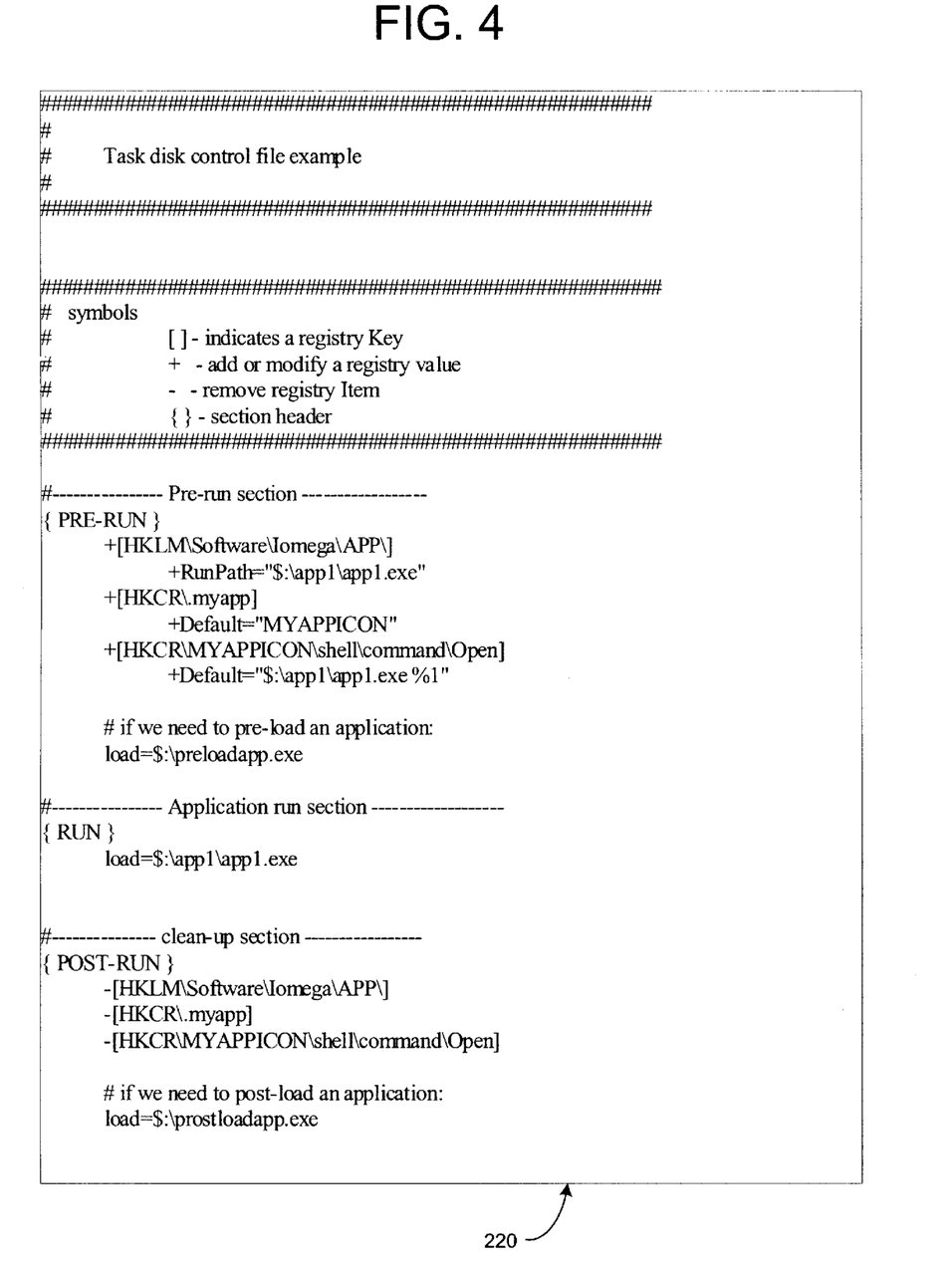
FIG. 4 is an exemplary task disk control file in accordance with the present invention.

An exemplary task disk control file 220 is illustrated in FIG. 4, and contains configuration and execution information and regarding the participating application. For example the TDCF 220 may contain information such as the executable filename, path information, and Windows® registry data, including the identification of necessary device drivers, Dynamic Link Libraries, VxDs, etc. The contents of the TDCF will be discussed in greater detail below.

If a valid task disk control file (TDCF) 220 does not exist (step 210), the disk is mounted for use, however, the system returns to step 200 to monitor for subsequent device commands, as the disk cannot be used to configure and launch an application or device. Alternatively, a message may be generated and displayed to the user indicating the TDCF 220 is not valid. If a valid TDCF 220 exists, then at step 212, a unique identifier (e.g., serial number) of the media 28 is read. In accordance with a feature of the present invention, the TDCF 220 may be encrypted using the media serial number as an encryption key to provide an added measure of security and to prevent the application software from being copied and run from another piece of media. For the purposes of the present invention, any encryption algorithm may be used.

The media serial number may be obtained by an application running on the PC 20 that reads the unique identifier and authentication code. This is performed by querying the media using an application programming interface (API) such as the Iomega Ready API, or other suitable method.

The Iomega Ready API when invoked causes the media drive to read the unique serial number from the predetermined track by using the SCSI 0x06 Non-Sense Command. In particular, by invoking the Disk Status Page (page 0x02) of the Non-Sense Command, the media serial number may be determined by reading offset bytes 20–59 of the returned data structure. Exemplary source code for reading the serial number of an Iomega ZIP® drive and disk is as follows:

```
void CClientApp::GetZipDrive( )
{
  int j,k;
  m_DriveNum=0;
  for(j=0;j<26;j++)
    //scan the drives and find the IOMEGA drives
  {
    if(IsIomegaDrive(j))
    {
      k=GetGeneralDevType(j);
      if( k==DRIVE_IS_ZIP)
      {
        m_DriveNum=j;
        j=26;
      }
    }
  }
}
void CClientApp::GetSerialNumber( )
{
  unsigned char szBuffer[1024]; memset(szBuffer,0,
    sizeof(szBuffer)); memset(&m_SerialNumber,0,
    40); GetInfoNonSense(m_DriveNum,0x02,
    szBuffer); memcpy(&m_SerialNumber,&szBuffer
    [22],39);
}
```

It can be appreciated that the unique serial number should contain a sufficient number of bits (length) to ensure that no two pieces of media have the same identifier. For example, each Iomega ZIP® disk contains a unique 39 byte (312 bits) serial number, and other bit lengths may be utilized.

Once the media serial number is read, the task disk control file (TDCF) 220 is processed at step 214, where it is decrypted using the media serial number as a decryption key. It is noted that encryption of the TDCF 220 is not necessary for the operation of the present invention, and is provided as a security feature to prevent, e.g., illegal copying of copyrighted program files on the removable media 28. Accordingly, step 210 may be provided with a mechanism to determine if the TDCF is encrypted, and if not, jump to step 216.

At step 216, the unencrypted TDCF 220 is read and the system environment is configured in accordance with information contained in the TDCF 220 prior to launching the participating application.

Referring to FIG. 4, the TDCF 220 contains three sections of configuration information labeled as follows: pre-run, application run, and clean-up. The pre-run section configures registry information such that the operating system is aware of the path, environmental variables and commands to launch the participating application. Optionally, the pre-run section may specify files (e.g., executable files, DLLs, device drivers, etc.) that are to be copied to the hard drive to properly execute the participating application. The application run section instructs the operating system to load the participating application, which launches the participating application for use by a user (see, step 218, below). The clean-up section removes all registry information added by the pre-run section (see, step 224, below). Optionally, the clean-up section may remove from the hard drive the files (e.g., executable files, DLLs, device drivers, etc.) copied thereto to execute the participating application.

In accordance with the present invention, the TDCF 220 may configure the system environment to run applications in several modes. In a first mode of operation, the participating application is stored on, and run from, the removable media 28 upon insertion. In this first mode of operation, everything necessary to run the participating application is maintained and executed from the removable media 28. Thus, no files are copied to the hard drive, nor are any files required to be on the hard drive to run the participating application.

In a second mode of operation, the participating application cannot be run from the removable media 28 alone. In this mode, certain files are copied to the hard disk as specified in the pre-run section of the TDCF 220. These files may include, but are not limited to the above-mentioned executable files, DLLs, device drivers, etc. It may be necessary to copy files to the hard disk to because of limitations in speed or size of the removable media 28. In the second mode, when the participating application is closed or the removable disk 28 ejected, the previously copied files are removed from the hard drive in accordance with the clean-up section such that the hard disk is returned to essentially the same state it was in prior to the insertion of the removable media 28.

In a third mode, the participating application cannot be run from the removable media 28 alone, as in the second mode. However, in this mode when the participating application is closed or the disk ejected, the files are not removed from the hard drive. In the third mode, the previously copied files remain on the hard disk in accordance with the clean-up section, such that any subsequent insertion of the removable media 28 would not require copying of the specified files to the hard drive. This third mode of operation speeds up the launching of the participating application for second and subsequent insertions of the removable disk 28 into the removable media drive 52.

In a fourth mode, the participating application is installed to, and stored on, the computer's hard drive. The participating application's installation program preferably includes an option to make it "participating" in accordance with the present invention. Optionally, a plug-in may be used to hook into the participating application to make it "participating" in accordance with the present invention. The pre-run section of the TDCF contains all of the instructions necessary to automatically launch the participating application from the hard drive and, optionally, load data files as the participating application is launched. The data files are preferably on the removable media 28, but also may reside on the hard disk. In this fourth mode, the TDCF 220 contains a list of instructions to open and close the participating application, such that the removable media acts as a "key" to automatically open the participating application upon insertion into the removable media drive 52.

It is noted that the TDCF 220 of FIG. 4 is provided herein for exemplary purposes only. Further, the TDCF 220 may contain additional or fewer instructions to configure the computer 20, copy files to the computer 20, etc. than illustrated. Further, additional or few modes of operation are possible. In accordance with the present invention, the TDCF 220 contains the instructions necessary to properly configure and launch the participating application upon insertion of the removable media 28, and gracefully remove configuration settings and save data files without the need for user intervention.

Returning again to FIG. e, at step 218, once the PC 20 is configured in accordance with the TDCF 220, the participating application is launched for use and the system returns to step 200 to monitor for new events.

Returning again to step 204, if an event identified is a Save/Close Complete event, then processing continues at step 222. A Save/Close Complete event occurs when the user has finished using the participating application and either selects exit or clicks the "(x)" box (i.e., close window box) in the application window. At step 222 the participating application saves all data files, deletes all temporary files and indicates to the system that it is ready to terminate. The data files may be saved in accordance with a predetermined file path set by the TDCF 220. At step 224 all configuration information is removed from the PC 20 in accordance with the clean-up section of the TDCF 220. The clean-up section will perform certain clean-up functions based on a mode of operation, as noted above. Next, at step 226, the participating application terminates and the removable media 28 is ejected by the present invention from the media drive 52. Processing then continues at step 200.

Again returning to step 240, if an event detected a Media Eject Request Event, then processing continues at step 228. A Media Eject Request Event is a condition that exists when the user has initiated an eject function by pressing an eject button provided on the drive 52 or through a provide software eject feature. At step 230, the participating application is notified via inter-application mechanisms, such as a message, that a "request for media eject" was detected. Next, at step 232, the system executes steps 222–226 as discussed above to complete. Once the present invention is notified of a completion at step 234, processing returns to step 200 to monitor for new events.

Thus, as described above, the present invention provides a new and improved system for managing data files and applications that requires very little, if any, user attention. In accordance with the present invention, the user need only know that insertion of a particular piece of removable media launches a particular application or starts a particular device or peripheral that he or she wants to use. The user's data files are saved to the same piece of removable media or other specified location for easy retrieval, therefore, the user's data is easily obtainable for use when the application is launched. When the user has completed using the application and exits, the removable media is ejected from the computer to be placed away for safekeeping.

It is noted that the foregoing examples have been provided merely for the purpose of explanation and are in no way to be construed as limiting of the present invention. While the invention has been described with reference to preferred embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed is:

1. A computer-readable medium containing instructions to be automatically executed by a computing device without the need for user intervention when the computing device is coupled to a media drive that receives said computer-readable medium, said instructions comprising:

configuring said computing device in accordance with a task disk control file contained on said computer-readable media;

launching a participating application in accordance with information in said task disk control file;

monitoring events in said media drive and said participating application until execution of said participating software application is detected to be completed or terminated; and thereafter saving certain data files to a predetermined location specified in said task disk control file;

deleting temporary files;

unconfiguring said computing device; and disconnecting said computer-readable media from said media drive.

2. The computer-readable medium as recited in claim 1, wherein said configuring said computing device in accordance with said task disk control file further comprises:

determining a unique identifier of said computer-readable medium;

accessing said task disk control file in accordance with said unique identifier; and configuring said computing device by providing as least one of the following executable files: linked library files, device drivers, path information, environmental information, and registry entries to said computing device.

3. The computer-readable medium as recited in claim 1, wherein said monitoring events comprises monitoring for an application save/close completion event or monitoring for a request to disconnect said computer-readable medium.

4. The computer-readable medium as recited in claim 1, wherein said participating application is adapted to be stored on removable or on non-removable storage media.

5. The computer-readable medium as recited in claim 1, wherein said launching said participating application in accordance with information in said task disk control file comprises launching said participating application from said computer readable medium.

6. The computer-readable medium as recited in claim 1, wherein said launching said participating application in accordance with information in said task disk control file comprises launching said participating application from said computing devices.

7. A computer-readable medium having stored thereon a task list control file comprising:

a monitoring section to detect an activation event for a predetermined participating application, such that when the activation event occurs the following special instruction sections are automatically executed:

a pre-run section containing instructions to be executed by a computer-implemented device prior to launching said predetermined participating application;

an application run section containing instructions to launch said participating application and further instructions to copy or maintain certain data files at specific storage locations to be available for use during running of said participating application ; and a clean-up section containing instructions to be executed upon closing said participating application including additional instructions to remove or save certain data files at specific storage locations prior to said closing, and wherein said monitoring section is capable to detect a termination event for said participating application such that when the termination event occurs the cleanup section is automatically executed.

8. The task list control file of claim 7, wherein said pre-run section comprises instructions to configure registry information such that the operating system is aware of at least one of the following: a path, environmental variables, and commands to launch said participating application.

9. A method of managing selected software for use with a computer device in accordance with special instructions contained on storage media external to or removable from the computer device, said method comprising:

activating the storage media to establish communication with the computer device;

providing the special instructions in a control file located on the storage media, the special instructions including configuration information, software launching information; and data file storage information, wherein certain special instructions are automatically executed without user intervention including the following:

configuring the computer device in accordance with the configuration information;

launching the selected software in accordance with the software launching information;

monitoring events to determine various stages in the operation of the selected software; and storing, saving, and/or removing data files related to the operation of the selected software in accordance with the data file storage information.

10. The method of claim 9 which includes a mode of operation wherein the selected software is stored on the storage media.

11. The method of claim 9 wherein the selected software is run from the storage media.

12. The method of claim 11 wherein certain data files are copied or maintained on the storage media to be available for use during running of the selected software.

13. The method of claim 11 wherein certain data files are copied or maintained on the computer device to be available for use during running of the selected software.

14. The method of claim 13 wherein certain data files are removed from the computer device when the running of the selected software is completed.

15. The method of claim 13 wherein certain data files are saved on the computer device when the running of the selected software is completed.

16. The method of claim 11 wherein certain data files and certain configuration information are saved on the storage media when the running of the selected software is completed.

17. The method of claim 9 which includes a mode of operation wherein the selected software is stored on the computer device.

18. The method of claim 9 wherein the selected software is run from the computer device.

19. The method of claim 18 wherein certain data files are copied or maintained on the storage media to be available for use during running of the selected software.

20. The method of claim 18 wherein certain data files are copied or maintained on the computer device to be available for use during running of the selected software.

21. The method of claim 20 wherein certain data files are removed from the computer device when the running of the selected software is completed.

22. The method of claim 20 wherein certain data files are saved on the computer device when the running of the selected software is completed.

23. The method of claim 18 certain data files and certain configuration information are saved on the storage media when the running of the selected software is completed.

24. The method of claim 9 which includes providing configuration information in the control file relating to the selected software including pre-run preparations, launching, and post-run activities.

25. The method of claim 9 which includes monitoring the following events:

activating the selected software; and terminating the operation of the selected software.

26. The method of claim 25 wherein activating the selected software includes inserting removable media into a storage drive, and terminating the operation of the selected software includes ejecting removable media from a storage drive.

* * * * *